(12) United States Patent
Wang et al.

(10) Patent No.: US 7,652,112 B2
(45) Date of Patent: *Jan. 26, 2010

(54) POLYMERIC EXTENDERS FOR SURFACE EFFECTS

(75) Inventors: Ying Wang, West Chester, PA (US); John J. Fitzgerald, Boothwyn, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 462 days.

This patent is subject to a terminal disclaimer.

(21) Appl. No.: 11/175,680

(22) Filed: Jul. 6, 2005

(65) Prior Publication Data

US 2007/0009663 A1 Jan. 11, 2007

(51) Int. Cl.
*C08F 118/02* (2006.01)
*C08F 20/26* (2006.01)

(52) U.S. Cl. .................. 526/319; 526/304; 526/320; 526/329.4; 526/329.6; 526/330; 526/333; 526/343; 526/344; 525/218; 525/223; 525/227; 525/239; 525/330.3; 525/330.5

(58) Field of Classification Search .................. 524/507, 524/515, 523, 524, 555, 556, 561, 589; 525/218, 525/223, 227, 239, 330.3, 330.5; 526/304, 526/320, 329.4, 329.6, 330, 333, 343, 344
See application file for complete search history.

(56) References Cited

U.S. PATENT DOCUMENTS

| | | | |
|---|---|---|---|
| 3,256,230 | A | 6/1966 | Johnson et al. |
| 3,256,231 | A | 6/1966 | Johnson et al. |
| 3,378,609 | A | 4/1968 | Fasick et al. |
| 3,781,232 | A | 12/1973 | Gaylord |
| 3,916,053 | A | 10/1975 | Sherman et al. |
| 4,043,964 | A | 8/1977 | Sherman et al. |
| 4,742,140 | A | 5/1988 | Greenwood et al. |
| 5,202,378 | A | 4/1993 | Barnett |
| 5,344,903 | A | 9/1994 | Raiford et al. |
| 5,466,770 | A | 11/1995 | Audenaert et al. |
| 6,180,740 | B1 | 1/2001 | Fitzgerald |
| 6,309,752 | B1 | 10/2001 | Dams et al. |
| 6,353,051 | B1 * | 3/2002 | Huang .................. 524/544 |
| 6,380,336 | B1 | 4/2002 | Soane et al. |
| 6,451,717 | B1 | 9/2002 | Fitzgerald |
| 6,472,476 | B1 | 10/2002 | Soane et al. |
| 6,479,605 | B1 | 11/2002 | Franchina |
| 6,566,470 | B2 | 5/2003 | Kantamneni et al. |
| 6,646,043 | B2 | 11/2003 | Funaki et al. |
| 6,818,717 | B2 | 11/2004 | Kantamneni |
| 6,979,711 | B2 | 12/2005 | Franchina |
| 2003/0106161 | A1 | 6/2003 | Enomoto et al. |
| 2004/0077237 | A1 | 4/2004 | Audenaert et al. |
| 2004/0077775 | A1 | 4/2004 | Audenaert et al. |
| 2005/0027063 | A1 | 2/2005 | Audenaert et al. |

FOREIGN PATENT DOCUMENTS

| | | |
|---|---|---|
| BE | 773248 | 3/1972 |
| EP | 1496073 | 1/2005 |
| GB | 1372037 | 10/1974 |
| JP | 61291677 | 12/1986 |
| JP | 0408282 | 3/1992 |
| JP | 1996301907 A | 11/1996 |
| JP | 11209546 A | 8/1999 |
| JP | 20040161838 | 6/2004 |
| JP | 2005054020 | 3/2005 |
| WO | WO 00/53676 A1 | 9/2000 |
| WO | WO 2004067579 | 8/2004 |

* cited by examiner

*Primary Examiner*—Helen L. Pezzuto
(74) *Attorney, Agent, or Firm*—Nancy S. Mayer

(57) ABSTRACT

A polymer extender composition comprising monomers copolymerized in the following percentages by weight:

(a) from about 5% to about 90% of a monomer of the formula I:

$$R_1-OC(O)-C(R)=CH_2 \qquad (I)$$

(b) from about 5% to about 85% of vinylidene chloride, vinyl chloride, vinyl acetate, or a mixture thereof, (c) from about 0.5% to about 3% of a monomer of the formula II:

$$HO-CH_2-NH-C(O)-C(R)=CH_2 \qquad (II)$$

(d) from about 0.5% to about 3% of a monomer of the formula III $$HO-CH_2CH_2-OC(O)-C(R)=CH_2 \qquad (III)$$

and (e) from about 1% to about 5% of a monomer of the formula IV:

$$H-(OCH_2CH_2)_m-O-C(O)-C(R)=CH_2 \qquad (IV)$$

(f) from 0% to about 25% of methyl methacrylate, vinylbenzyl chloride, styrene or a mixture thereof, wherein
each R is independently H or $CH_3$;
$R_1$ is a linear or branched or cyclic alkyl chain having from about 4 to about 18 carbon atoms, and
m is 2 to about 10.

9 Claims, No Drawings

POLYMERIC EXTENDERS FOR SURFACE EFFECTS

FIELD OF THE INVENTION

Polymeric extender compositions are employed to improve the performance of treating agents which provide surface effects to treated substrates.

BACKGROUND OF THE INVENTION

Various compositions are known to be useful as treating agents to provide surface effects to substrates. Surface effects include repellency to moisture, soil, and stains, and other effects, which are particularly useful for fibrous substrates such as fibers, fabrics, textiles, carpets, paper, leather, and other such substrates. Many such treating agents are fluorinated polymers or copolymers.

Fluorinated polymer compositions having utility as fibrous substrate treating agents generally contain pendant perfluoroalkyl groups of three or more carbon atoms, which provide oil- and water-repellency when the compositions are applied to fibrous substrate surfaces. The perfluoroalkyl groups are generally attached by various connecting groups to polymerizable groups not containing fluorine. The resulting monomer is then generally copolymerized with other monomers, which confer additional favorable properties to the substrates. Various specialized monomers may be incorporated to impart improved cross-linking, latex stability and substantivity. Since each ingredient may impart some potentially undesirable properties in addition to its desirable ones, the specific combination is directed to the desired use. These polymers are generally marketed as aqueous emulsions for easy application to the fibrous substrates. U.S. Pat. No. 6,479,605 discloses a fluorinated copolymer useful for treating fibrous substrates to provide oil repellency and water repellency.

Various attempts have been made to increase the oil- and water-repellency imparted to the substrate and its durability while reducing the amount of fluorinated polymer required, i.e., boost the efficiency or performance of the treating agent. One method is to incorporate blocked isocyanates or melamine resins. However, only limited amounts can be used because these ingredients tend to adversely affect the handle (the feel) of the fibrous substrates. Another method is the use of various extender polymers. These are typically hydrocarbon polymers in aqueous emulsions, which are blended with the fluorinated polymer emulsion before application to the substrate.

U.S. Pat. No. 6,309,752 discloses compositions comprising a fluorochemical agent, a copolymer extender comprising two distinct polymerized units, and a blocked isocyanate extender, wherein the extenders in combination improve the fluorine efficiency of the fluorochemical agent to a greater degree than either of the extenders alone. The two distinct polymerized units are (1) optionally halogenated polymerizable ethylenic compounds, particularly acrylates; and (2) ethylenic compounds containing a functional group that can react with a fabric. It has been found that blocked isocyanate extenders tend to adversely affect the hand (feel) of the fibrous substrate.

There is a need for polymer compositions, which significantly improve the performance of surface effect agents. In particular, there is a need for compositions which improve the performance of fluorinated polymer treating agents for substrates to provide repellency and other surface effects while reducing the amount of fluorinated polymer required. The present invention provides such a composition.

SUMMARY OF THE INVENTION

The present invention comprises a polymer extender composition for use with agents which when applied to a substrate, provides a surface effect, said composition comprising monomers copolymerized in the following percentages by weight:

(a) from about 5% to about 90% of a monomer of the formula I:

$$R_1-OC(O)-C(R)=CH_2 \qquad (I)$$

(b) from about 5% to about 85% of vinylidene chloride, vinyl chloride, vinyl acetate, or a mixture thereof, (c) from about 0.5% to about 3% of a monomer of the formula II:

$$HO-CH_2-NH-C(O)-C(R)=CH_2 \qquad (II)$$

(d) from about 0.5% to about 3% of a monomer of the formula III $$HO-CH_2CH_2-OC(O)-C(R)=CH_2 \qquad (III)$$

(e) from about 1% to about 5% of a monomer of the formula IV:

$$H-(OCH_2CH_2)_m-O-C(O)-C(R)=CH_2 \qquad (IV)$$

(f) from 0% to about 25% of methyl methacrylate, vinylbenzyl chloride, styrene or a mixture thereof, wherein
each R is independently H or $CH_3$;
$R_1$ is a linear or branched or cyclic alkyl chain having from 4 to 18 carbon atoms, and
m is 2 to about 10.

The present invention further comprises a method of treating a substrate comprising contacting the substrate with a composition comprising i) an agent which provides a surface effect and ii) a polymer extender composition as described above.

The present invention further comprises a substrate treated by a composition comprising i) an agent which provides a surface effect and ii) a polymer extender composition as described above.

DETAILED DESCRIPTION OF THE INVENTION

Trademarks and tradenames are indicated herein by capitalization. This invention comprises an extender polymer composition useful for improving the performance of treating agents that provide surface effects to substrates. In particular, the extender composition is useful for improving the performance of fluorinated polymers in imparting durable properties to fibrous substrates. The fibrous substrates include paper, nonwovens, leather, carpet, fibers, textiles, and fabrics or fabric blends. By "fabrics" is meant natural or synthetic fabrics, or blends thereof, composed of fibers such as cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of at least one natural fiber and at least one synthetic fiber, but also can be a blend of two or more natural fibers or of two or more synthetic fibers.

Superior surface properties, along with desirable properties of low yellowing, soft hand and improved durability, can be imparted to fibrous substrates by the addition of the inventive extender polymer composition to surface treating agent composition before application to the fibrous substrates. These combined compositions can be applied to the fibrous substrates in the form of a dispersion in water or other solvent either before, after or during the application of other treatment chemicals.

When so applied, the extender composition of the present invention in combination with a fluorinated polymer-treating agent has been found to increase the durability of surface properties, especially oil- and water-repellency, in fibrous substrates. Further, use of the extender composition increases fluorine efficiency by permitting use of lower levels of the fluorinated polymer. This is desirable because fluorinated polymer surface treating agents tend to be expensive.

The extender polymer compositions of this invention are prepared by conventional emulsion polymerization techniques. Generally, such copolymers are prepared by copolymerization of two or more monomers in an aqueous media with the resulting dispersion or emulsion stabilized using a surfactant. The surfactant employed to stabilize the emulsion during its formation and during polymerization can be a conventional cationic, nonionic, and/or anionic emulsifying agent or mixtures thereof. The polymerization is conveniently initiated by any free radical initiators such as 2,2'-azobis(2-amidinopropane)dihydrochloride, which is sold by E. I. du Pont de Nemours and Company, Wilmington, Del., commercially under the name of "VAZO".

The aqueous dispersions produced by mixing the extender composition dispersion with a fluorinated polymer dispersion are applied to the surfaces of fibrous substrates by known methods to impart oil-, soil- and water-repellency and other surface effects. Examples of these fluoropolymer dispersions are ZONYL available from E. I. du Pont de Nemours and Company, Wilmington, Del.; OLEOPHOBOL from Ciba Specialty Chemicals, Langweid, Germany; ASAHI GARD from Asahi Glass Company, Ltd., Tokyo, Japan; UNIDYNE from Daikin America, Inc., Orangeburg, N.Y.; SCOTCHGARD from 3M Company, St. Paul, Minn.; and NANO TEX from Nanotex, Emeryville, Calif. A distinguishing feature of the inclusion of the extender compositions of the present invention is high fluorine efficiency and high durability of the finish on the substrate.

The extender polymer composition of the present invention comprises a copolymer comprising monomers copolymerized in the following percentages by weight:

(a) from about 5% to about 90% of a monomer, or mixture of monomers, of formula I:

$$R_1\text{—OC(O)—C(R)=CH}_2 \quad (I)$$

(b) from about 5% to about 85% of vinylidene chloride, vinyl chloride, vinyl acetate, or a mixture thereof, (c) from about 0.5% to about 3% of a monomer of the formula II:

$$\text{HO—CH}_2\text{—NH—C(O)—C(R)=CH}_2 \quad (II)$$

(d) from about 0.5% to about 3% of a monomer of the formula III $$\text{HO—CH}_2\text{CH}_2\text{—OC(O)—C(R)=CH}_2 \quad (III)$$

and (e) from about 1% to about 5% of a monomer of the formula IV:

$$\text{H—(OCH}_2\text{CH}_2)_m\text{—O—C(O)—C(R)=CH}_2 \quad (IV)$$

(f) from 0% to about 25% of methyl methacrylate, vinylbenzyl chloride, styrene or a mixture thereof, wherein
each R is independently H or $CH_3$;
$R_1$ is a linear or branched alkyl chain having from about 4 to about 18 carbon atoms, and
m is 2 to about 10.

The term "(meth)acrylate" is used herein to mean either methacrylate, acrylate, or a mixture of the two.

The required monomer (a) of formula I in the present invention is one or a mixture of alkyl(meth)acrylates having chain lengths of from about 4 to about 18 carbons. These are added to the polymerization in proportions from about 5% to about 90%. Preferably the proportion of monomer (a) in the copolymer is between about 40% and about 85% by weight. As used herein, "alkyl" refers to linear, branched-chain and cyclic alkyl groups. Examples of such monomers include stearyl(meth)acrylate, lauryl(meth)acrylate, 2-ethylhexyl (meth)acrylate, isodecyl(meth)acrylate, butyl(meth)acrylate, hexyl(meth)acrylate, cyclohexyl(meth)acrylate, and others. Of the foregoing, stearyl acrylate and stearyl methacrylate are most preferred.

The required monomer (b) is vinylidene chloride, vinyl chloride, vinyl acetate or a mixture thereof. It is added to the polymerization in proportions from about 5% to about 85%. Preferably the proportion of monomer (b) in the copolymer is between about 5% and about 50% by weight.

Monomers (c), (d) and (e) act together to improve the durability of the treating agent. Monomer (c) is N-methylol acrylamide or methacrylamide. N-methylol acrylamide is preferred. It is added to the polymerization in proportions from about 0.5% to about 3%, preferably from about 0.7% to about 1.5%. Monomer (d) is a hydroxyethyl (meth)acrylate. It is added to the polymerization in proportions from about 0.5% to about 3%, preferably from about 0.7% to about 1.5%. Monomer (e) is an ethoxylated (meth)acrylate wherein the number of ethoxy groups is between 2 and about 10. Between about 4 and about 10 ethoxy groups are preferred. It is added to the polymerization in proportions from about 1% to about 5%, preferably about 1.5% to about 3%.

The extender composition described above is then blended with any of a variety of known treating agents for fibrous substrates. Of particular interest are fluorinated polymers useful as treating agents to provide repellency properties to the surface of treated substrates. The copolymer dispersion is blended with the fluorinated polymer in a ratio of from about 0.5:10 to about 6:1, preferably from about 1:3 to about 3:1, and more preferably from about 1:2 to about 2:1. The fluorine content of the blend is from about 1.5% to about 6.6% by weight, preferably from about 2.0% to about 4.0% by weight. The fluorinated polymer treating agents are any of those used for creating surface effects on a fibrous substrate, in particular oil- or water-repellency. These include fluorinated compounds or polymers containing one or more fluoroaliphatic groups (designated here as $R_f$ groups) which are fluorinated, stable, inert, non-polar, preferably saturated, monovalent and both oleophobic and hydrophobic. The $R_f$ groups preferably contain at least 3 carbon atoms, more preferably 3 to about 20 carbon atoms, and most preferably about 6 to about 14 carbon atoms. The $R_f$ groups may contain straight or branched chain or cyclic fluorinated alkylene groups or combinations thereof. The terminal portion of the $R_f$ groups is a perfluorinated aliphatic group of the formula $C_nF_{2n+1}$ wherein n is from about 3 to about 20.

Examples of such fluorinated polymers preferably include $R_f$-containing polyurethanes and poly(meth)acrylates. Especially preferred are copolymers of fluorochemical (meth) acrylate monomers with a co-polymerizable monovinyl compound or a conjugated diene. The co-polymerizable monovinyl compounds include alkyl(meth)acrylates, vinyl esters of aliphatic acids, styrene and alkyl styrene, vinyl halides, vinylidene halides, alkyl esters, vinyl alkyl ketones, and acrylamides. The conjugated dienes are preferably 1,3-butadienes. Representative compounds within the preceding classes include the methyl, propyl, butyl, 2-hydroxypropyl, 2-hydroxyethyl, isoamyl, 2-ethylhexyl, octyl, decyl, lauryl, cetyl, and octadecyl acrylates and methacrylates; vinyl acetate, vinyl propionate, vinyl caprylate, vinyl laurate, vinyl stearate, styrene, alpha methyl styrene, p-methylstyrene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, N-methylolacrylamide, N-methylolmethacrylamide, glycidyl acrylate, glycidyl methacrylate, and polyoxymethacrylates.

The blended composition comprising a fluorinated polymer and the extender polymer of the present invention applied to the fibrous substrate may optionally contain a blocked isocyanate to further promote durability, added after copolymerization (i.e., as a blended isocyanate). An example of a blocked isocyanate is HYDROPHOBOL XAN available from Ciba Specialty Chemicals, High Point, N.J. Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to the substrate. When added as a blended isocyanate, amounts up to about 20% by weight may be added.

The blended composition comprising a fluorinated polymer and the extender composition of the present invention optionally further comprises additional components such as treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. One or more such treating agents or finishes can be combined with the blended composition and applied to the fibrous substrate. Other additives commonly used with such treating agents or finishes may also be present such as surfactants, pH adjusters, cross linkers, wetting agents, wax extenders, and other additives known by those skilled in the art. Suitable surfactants include anionic, cationic, and nonionic. Preferred is an anionic surfactant such as sodium lauryl sulfonate, available as DUPONOL WAQE from Witco Corporation, Greenwich, Conn.

In particular, the blended composition comprising a fluorinated polymer and the extender polymer of the present invention applied to the fibrous substrate may further comprise a softener to further promote hand, added after copolymerization. The desirability of adding a softener depends on the particular application for the copolymer. The examples of softener can be chosen from Wacker Chemical softener products such as WACKER FINISH WR 1300, WACKER FINISH CT 34E, WACKER FINISH WT 1650, JETSOFT NFS, POWERSOFT AE 38 and WETSOFT AOP, or from Dow Chemical, Silicone softener 2-8031. Amounts up to 1% by weight may be added.

Optionally, when the above blend of extender polymer composition and fluoropolymer composition are applied to fibrous substrates, other extender compositions may also be included in the application to obtain some combination of benefits. One example of such an optional additional extender polymer composition is that disclosed in co-pending U.S. Provisional Application 60/607,612, filed Sep. 7, 2004 (CH-2996). When such an optional extender is added to the previously described inventive extender polymer, the percentages given above for the inventive ingredients (a), (b), (c), (d) and (e) shall apply to the total extender polymer composition.

The present invention further comprises a method of treating substrates comprising contacting the surface of the substrate with an effective amount of a composition comprising an extender composition of the present invention as described above and a treating agent which provides a surface effect when applied to a substrate. Preferably the treating agent is a fluorinated polymer. The blended combination is applied to the fibrous substrate to be treated from aqueous dispersions, either alone or in a mixture with other textile treatment agents, finishes or additives as described above. The dispersions are generally applied to fibrous substrates by spraying, dipping, padding, or other well-known methods. After excess liquid has been removed, for example by squeeze rolls, the treated fibrous substrate is dried and then cured by heating, for example, to 100° C. to 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features. The treated fibrous substrate has a fluorine content of from about 0.05% to about 0.5% by weight.

The present invention further comprises substrates treated with the above-described composition comprising i) a treating agent which provides a surface effect and ii) the extender copolymer of the present invention as described above. The composition also can contain optional agents to provide additional surface effects as described above, optional additives commonly used in treating substrates as described above, optional blocked isocyanate as described above, and optional additional distinct extender compositions. As previously noted such substrates include fibers, paper, nonwovens, leather, textiles, and fabrics or fabric blends. "Fabrics" includes natural or synthetic fabrics composed of fibers of cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of at least one natural fiber and t least one synthetic fiber, but also can be a blend of two or more natural fibers or of two or more synthetic fibers. Preferably, the substrate has been treated with a composition comprising an extender composition of the present invention and a fluorinated polymer such as a polyurethane or poly(meth)acrylate.

Specifically, the composition, method and treated substrates of the present invention are useful to enhance surface properties, in particular oil-, water- and soil-repellency, of the above-described substrates while reducing the amount of fluorinated polymer employed. The repellency property is more durable than applications of fluorinated polymer without the extender present, and is effective for various fibrous substrates. The repellency property is effective with a variety of other surface effects. The treated substrates of the present invention are useful in a variety of applications such as for textiles, clothing, uniforms, protective garments, furnishings and the like. The extender copolymers of the present invention are advantageous in that they give highly durable, low yellowing and soft hand repellent finishes over a wide range of fibrous substrates, such as fabrics or fabric blends, while using a reduced level of the fluorinated polymer. The inventive compositions are made at lower materials cost than the current (meth)acrylate copolymers, for example by reducing the amount of the expensive fluorinated polymer required to provide the desired surface effects.

Test Method 1—Fabric Treatment

The fabric was treated with the copolymer blend using a conventional pad bath (dipping) process. A bath containing 0.1 to 0.5% by weight of the fluorinated polymer-treating agent blended with the extender copolymer of the present invention (hereinafter copolymer blend), as detailed in the Tables in the Example section, was used to treat fabrics. The fluoropolymers used for blending with the non-fluorinated copolymer extenders were commercial ZONYL products that are available from E. I. du Pont de Nemours and Company, Wilmington, Del. After application, the fabrics were cured at approximately 160° C. for 1-3 minutes, and allowed to "rest" after treatment and cure. The resting time employed was overnight, about 15-18 hours.

Test Method 2—Water Repellency

The water repellency of a treated substrate was measured according to the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances. The composition of standard test liquids is shown in the following Table 1. Sometimes a 1-6 scale was used for convenience. Ratings of 0.5 increments are determined by subtracting one half from the numbers in Table 1 for borderline passing of the test liquid.

TABLE 1

Standard Test Liquids

| Water Repellency Rating Number | Composition, Isopropyl Alcohol | Vol. % Distilled Water |
|---|---|---|
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Test Method 3—Water Repellency—Spray Rating

Water repellency can be further tested by utilizing the spray test method. The treated fabric samples were tested for water repellency by following the AATCC standard Test Method No. 22-1996, conducted as follows: A fabric sample, treated with an aqueous dispersion of polymer as previously described, is conditioned for a minimum of 2 hours at 23° C.+20% relative humidity and and at 65° C.+10% relative humidity. The fabric sample is securely fastened on a plastic/metal embroidery hoop such that the fabric is wrinkle-free. The hoop is placed on the testing stand so that the fabric is facing up. Then 250 mL of water at 80±2° F. (27±1° C.) is poured into the testing funnel allowing the water to spray onto the fabric surface. Once the water has run through the funnel, the hoop is rapped against the edge of a solid object with the fabric facing down, rotated 180 degrees and rapped again. The spotted or wetted surface is compared with the AATCC standards found in the AATCC Technical Manual. The more wet the surface, the lower the number and the poorer the repellency. A 100 denotes no wetting, a 90 denotes slight wetting (three small spots), an 80 denotes wetting signified by several (10) spots at the spray points, a 70 denotes partial wetting of the upper fabric surface, a 50 denotes wetting of the entire upper fabric surface, and a 0 denotes complete wetting of the lower and upper fabric surface. A rating of 15, 25, 35, 45, 55, 60, 65, 75 or 85 indicates performance intermediate between the above-described rankings.

Test Method 4—Oil Repellency

The treated fabric samples were tested for oil repellency by a modification of AATCC standard Test Method No. 118, conducted as follows: A fabric sample, treated with an aqueous dispersion of polymer as previously described, is conditioned for a minimum of 2 hours at 23° C.+20% relative humidity and 65° C.+10% relative humidity. A series of organic liquids, identified below in Table 2, are then applied drop wise to the fabric samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating of the fabric is the highest numbered test liquid for which two of the three drops remained spherical to hemispherical, with no wicking for 30 seconds. In general, treated fabrics with a rating of 6 or more are considered good to excellent; fabrics having a rating of one or greater can be used in certain applications. Ratings of 0.5 increments are determined by subtracting one-half from the number in Table 2 for borderline passing of the text liquid.

TABLE 2

Oil Repellency Test Liquids

| Oil Repellency Rating Number | Test Solution |
|---|---|
| 1 | NUJOL Purified Mineral Oil |
| 2 | 65/35 Nujol/n-hexadecane by volume at 21° C. |
| 3 | n-hexadecane |
| 4 | n-tetradecane |
| 5 | n-dodecane |
| 6 | n-decane |
| 7 | n-octane |
| 8 | n-heptane |

Note:
NUJOL is a trademark of Plough, Inc., for a mineral oil having a Saybolt viscosity of 360/390 at 38° C. and a specific gravity of 0.880/0.900 at 15° C.

Test Method 5—Wash Durability

The fabric samples were laundered according to International Standard specifies domestic washing procedure for textile testing. Fabric samples are loaded into a horizontal drum, front-loading type (Type A, WASCATOR Fom71MP-Lab) of automatic washing machine with a ballast load to give a total dry load of 4 lb. A commercial detergent is added (AATCC 1993 standard Reference Detergent WOB) and the washer programmed with high water level with warm water (105° F., 41° C.), 15 minutes normal wash cycle followed by 2 times 13 minutes rinse and then 2 minutes spin dry. The sample and ballast are washed a designated number of times (5HW for 5 washes, 20HW for 20 washes etc.). After washing is complete, the wet fabric samples are dried in air, then ironed with a flatbed press at a surface temperature of 135-160° C., 30 seconds on each side.

EXAMPLES

In the Tables hereinafter, the term "fluorochemical" is used to identify the fluorinated polymer prior to its combination with the extender composition of the present invention.

Example 1

A water emulsion was prepared by mixing the following: 96 g of hot deionized $H_2O$ (50-60° C.), 3.2 g of ETHOQUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of stearyl methacrylate, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol, and then charged to a 500 mL of four-necked flask equipped with mechanic stir, thermocouple thermometer and chiller condenser (−5 to −10° C.). The charge was rinsed into the flask with 10 g of hot deionized water and purged with nitrogen for 30 minutes or until the temperature is below 30° C. 30 g of vinylidene chloride was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. over a period of thirty minutes and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 206 g with solids content of 27.92%. $T_m$=25.36° C. and $\delta H$=23.93 J/g.

The above-resulted latex was separately blended with commercially available fluoropolymers, ZONYL 8300, ZONYL 8412, and ZONYL 8932 from E. I. du Pont de Nemours and Company, Wilmington, Del. for performance tests. The blends contained a ratio of extender to fluoropolymer of from 3:1 to 1:1. The blend with ZONYL fluoropolymers were applied to 100% nylon fabric using Test Method 1 described above. The bath contained 20-50 g/L of the blended product for the data in Tables 4 and 5. For the data in Table 6, the bath contained 10-15 g/L of the fluorinated polymer and the ratio of the extender of Example 1 to fluorinated polymer was as shown in Table 6. A wetting agent ALKANOL 6112 (available from E. I. du Pont de Nemours and Company, Wilmington, Del.) was also included in the bath at 2 g/L. After application, the fabrics were cured at about 160° C. for about 2 minutes. The fabric was allowed to "rest" after treatment and cure. The treated fabric was tested for oil repellency, water repellency and spray repellency using Test Methods 2, 3, 4 and 5 described above. Results are listed in Tables 4-6.

Example 2-7

The procedure of Example 1 was followed, except for using different amounts of stearyl methacrylate and vinylidene chloride as shown below in Table 3. The solid content and melting point are also included in Table 3.

TABLE 3

Product Compositions and DSC Data

| | Example # | | | | | |
|---|---|---|---|---|---|---|
| | 2 | 3 | 4 | 5 | 6 | 7 |
| StMA* | 45 | 50 | 55 | 40 | 15 | 20 |
| VDC* | 15 | 10 | 5 | 20 | 45 | 40 |
| Solid % | 27.39 | 28.98 | 30.02 | 27.73 | 25.5 | 28.04 |
| $T_m$ (° C.)/ | 30.09/ | 31.39/ | 31.76/ | 30.47/ | 15.26/ | |
| $\delta H$ (J/g) | 42.78 | 32.52 | 35.36 | 73.31 | 15.18 | |

*StMA = stearyl methacrylate, VDC = vinylidene chloride

The extenders were blended with ZONYL fluorochemicals, applied to nylon fabric, and tested as described in Example 1. Results are in Tables 4-6.

Comparative Example A

A water emulsion was prepared by mixing the following: 96 g of hot deionized $H_2O$ (50-60° C.), 3.2 g of ETHOQUAD 18/25 (available from Akzo Nobel, Chicago, Ill.), 4.6 g of tridecyl alcohol 5-ethylene oxide adduct (ETHOX TDA 5 from Ethox Chemicals, Greenville, S.C.), 60 g of stearyl methacrylate, 1.25 g of poly(oxyethylene)7 methacrylate, 1.25 g of N-methylolacrylamide, 0.68 g of 2-hydroxyethyl methacrylate, 0.34 g of dodecyl mercaptan and 19.36 g of dipropylene glycol, and then charged to a 500 mL of four-necked flask equipped with mechanic stir, thermocouple thermometer and chiller condenser (−5 to −10° C.). The charge was rinsed into the flask with 10 g of hot deionized water and purged with nitrogen for 30 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. over a period of 30 minutes and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 206 g with solids content of 27.92%. $T_m$ was 32.86° C. and $\delta H$ was 39.27 J/g. The extender was blended with ZONYL fluorochemicals, applied to nylon fabric, and tested as described in Example 1. Results are in Tables 4-6.

Comparative Example B

A water emulsion was prepared by mixing the following: 167 g of hot deionized $H_2O$ (50-60° C.), 0.7 g of ETHOQUAD 18/25 (available from Akzo Nobel, Chicago, Ill.), 2.9 g of tridecyl alcohol 5-ethylen oxide adduct (ETHOX TDA-5, Ethox Chemicals, Greenville, S.C.), 3.33 g of poly(oxyethylene)7 methacrylate, 3.33 g of N-methylolacrylamide, 1.67 g of 2-hydroxyethyl methacrylate, 0.1 g of dodecyl mercaptan and 16.67 g of 2-methyl-2,4-pentanediol, and then charged to a 1 L autoclave. The autoclave was sealed and evacuated/filled with nitrogen three times. 30 g of vinylidene chloride was then charged. Then, 0.34 g of "VAZO" 56 WSP (E. I. du Pont de Nemours and Company, Wilmington, Del.) dissolved in 10 g deionized water was added to initiate polymerization. The mixture was heated to 50° C. over a period of 30 minutes and maintained for 8 hours with agitator at 150 RPM. The resulting latex extender was filtered through a milk filter. The extender was blended with ZONYL fluorochemicals, applied to nylon fabric, and tested as in Example 1. Results are in Tables 4-6.

TABLE 4

| | Fluorochemical | | | |
|---|---|---|---|---|
| | ZONYL 8932 | ZONYL 8932 Example Extender | ZONYL 8932 | ZONYL 8932 |
| | Comparative Ex. B | 1 | Comparative Ex. A | none |
| F % weight based on treated fabric | 0.093 | 0.097 | 0.1 | 0.19 |
| Oil Repellency | | | | |
| initial | 6 | 6 | 5 | 6 |
| 5HW | 5 | 6 | — | 3 |
| 20HW | 1 | 6 | 3 | 1 |
| Water Repellency | | | | |
| initial | 6 | 6 | 6 | 6 |
| 5HW | 6 | 6 | — | 6 |
| 20HW | 6 | 6 | 6 | 6 |

TABLE 4-continued

| | Fluorochemical | | | |
|---|---|---|---|---|
| | ZONYL 8932 | ZONYL 8932 Example Extender | ZONYL 8932 | ZONYL 8932 |
| | Comparative Ex. B | 1 | Comparative Ex. A | none |
| Spray Repellency | | | | |
| initial | 100 | 100 | 100 | 100 |
| 5HW | 80 | 90 | — | 70 |
| 20HW | 75 | 80 | 80 | 70 |

Note:
Tested using a scale of 1-6 for water and oil repellency in Test Method 2.

The results showed that the copolymer of Example 1 provided better performance than that of Comparative Examples A and B when employing similar levels of fluorine. Compared to the fluoropolymer without extender, better performance was obtained when the extender of Example 1 was used, even with only 50% of fluorine present.

TABLE 5A

| | F % in bath | | | | | | | | | | |
|---|---|---|---|---|---|---|---|---|---|---|---|
| | 0.198 | 0.099 | 0.099 | 0.099 | 0.099 | 0.099 | 0.099 | 0.099 | 0.099 | 0.099 | 0.099 |
| | | | ZONYL 8412 + Example Extender | | | | | | | | |
| | None | None | 1 | 2 | 3 | 4 | 5 | 6 | 7 | Comparative Ex. A | Comparative Ex. B |
| Oil Repellency | | | | | | | | | | | |
| initial | 6.5 | 6.5 | 7 | 7 | 8 | 7 | 7.5 | 7.5 | 7.5 | 7 | 6 |
| 20HW-iron | 4 | 2 | 5.5 | 4.5 | 4 | 3 | 4 | 7 | 5.5 | 3 | 1 |
| Water Repellency | | | | | | | | | | | |
| initial | 12 | 12 | 12 | 12 | 12 | 12 | 12 | 12 | 12 | 12 | 11 |
| 20HW-iron | 9 | 6 | 9 | 8 | 8 | 7 | 8 | 10.5 | 9.5 | 7.5 | 6 |
| Spray Repellency | | | | | | | | | | | |
| initial | 100 | 100 | 100 | 100 | 100 | 100 | 100 | 100 | 100 | 90 | 90 |
| 20HW-iron | 70 | 70 | 80 | 70 | 70 | 70 | 75 | 80 | 80 | 50 | 75 |

TABLE 5B

| | F % in bath | | | | | | | | | | |
|---|---|---|---|---|---|---|---|---|---|---|---|
| | 0.3 | 0.117 | 0.117 | 0.117 | 0.117 | 0.117 | 0.117 | 0.117 | 0.117 | 0.117 | 0.117 |
| | | | ZONYL 8932 + Example Extender | | | | | | | | |
| | None | None | 1 | 2 | 3 | 4 | 5 | 6 | 7 | Comparative Ex. A | Comparative Ex. B |
| Oil Repellency | | | | | | | | | | | |
| initial | 6.5 | 7 | 7 | 7 | 7 | 7 | 8 | 6 | 7 | 7 | 7 |
| 20HW-iron | 5 | 2 | 5 | 4.5 | 3 | 3 | 4 | 4.5 | 4 | 3.5 | 5 |
| Water Repellency | | | | | | | | | | | |
| initial | 12 | 12 | 12 | 12 | 12 | 12 | 12 | 11 | 12 | 12 | 12 |
| 20HW-iron | 8 | 6 | 9 | 10 | 7 | 7 | 8 | 9.5 | 8 | 8 | 8 |

TABLE 5B-continued

| | F % in bath | | | | | | | | | | |
|---|---|---|---|---|---|---|---|---|---|---|---|
| | 0.3 | 0.117 | 0.117 | 0.117 | 0.117 | 0.117 | 0.117 | 0.117 | 0.117 | 0.117 | 0.117 |
| | | | ZONYL 8932 + Example Extender | | | | | | | | |
| | None | None | 1 | 2 | 3 | 4 | 5 | 6 | 7 | Comparative Ex. A | Comparative Ex. B |
| Spray Repellency | | | | | | | | | | | |
| initial | 100 | 100 | 100 | 100 | 100 | 100 | 100 | 100 | 100 | 100 | 100 |
| 20HW-iron | 80 | 50 | 90 | 90 | 90 | 70 | 70 | 100 | 90 | 50 | 75 |

TABLE 5C

| | F % in bath | | | | | | | | | | |
|---|---|---|---|---|---|---|---|---|---|---|---|
| | 0.198 | 0.099 | 0.099 | 0.099 | 0.099 | 0.099 | 0.099 | 0.099 | 0.099 | 0.099 | 0.099 |
| | | | ZONYL 8300 + Example Extender | | | | | | | | |
| | none | none | 1 | 2 | 3 | 4 | 5 | 6 | 7 | Comparative Ex. A | Comparative Ex. B |
| Oil Repellency | | | | | | | | | | | |
| initial | 6.5 | 6 | 6.5 | 6 | 6.5 | 6 | 7 | 7 | 7 | 6 | 5 |
| 20HW-iron | 6 | 2 | 5 | 2 | 4.5 | 3 | 3 | 4.5 | 4 | 2.5 | 1 |
| Water Repellency | | | | | | | | | | | |
| initial | 12 | 11.5 | 11.5 | 11 | 11.5 | 11 | 11.5 | 12 | 12 | 11.5 | 9.5 |
| 20HW-iron | 7 | 6 | 8 | 6 | 10 | 8 | 7 | 8 | 9 | 8 | 6 |
| Spray Repellency | | | | | | | | | | | |
| initial | 100 | 100 | 100 | 100 | 100 | 100 | 100 | 100 | 100 | 100 | 90 |
| 20HW-iron | 70 | 50 | 75 | 50 | 80 | 85 | 70 | 90 | 80 | 70 | 80 |

The data in Tables 5A, 5B, and 5C showed that the blended formulation containing the extender of Examples 1 through 7 provided comparable or better performance with 50% fluorine reduction compared to the fluorochemical without extender on nylon fabric. The data also showed that the extenders of Examples 1 through 7 provided comparable or better performance than Comparative Examples A and B at the same level of fluorine.

TABLE 6

| | Fluorochemical | | | | | | | |
|---|---|---|---|---|---|---|---|---|
| | ZONYL 8932 | ZONYL 8932 | ZONYL 8300 | ZONYL 8300 | ZONYL 8300 | ZONYL 8412 | ZONYL 8412 | ZONYL 8412 |
| | Ratio of Extender of Ex. 1/ Fluorochemical | | | | | | | |
| | 1/1 | 2/1 | 0.6/1 | 1/1 | 2/1 | 0.6/1 | 1/1 | 2/1 |
| Oil Repellency | | | | | | | | |
| initial | 7.5 | 7.5 | 7.5 | 7.5 | 5.5 | 7.5 | 7.5 | 6.5 |
| 10HW-iron | 6.5 | 6.5 | 5.5 | 6.5 | 5.5 | 5.5 | 5.5 | 4.5 |
| 20HW-iron | 2.5 | 4.5 | 1.5 | 2.5 | 4.5 | 1.5 | 3.5 | 3.5 |
| Water Repellency | | | | | | | | |
| initial | 12 | 12 | 12 | 11.5 | 9.5 | 12 | 11.5 | 10.5 |
| 10HW-iron | 10.5 | 10.5 | 9.5 | 10.5 | 9.5 | 8.5 | 10.5 | 6.5 |
| 20HW-iron | 5 | 6.5 | 4.5 | 5.5 | 6.5 | 4.5 | 6.5 | 5.5 |

TABLE 6-continued

| | Fluorochemical | | | | | | | |
|---|---|---|---|---|---|---|---|---|
| | ZONYL 8932 | ZONYL 8932 | ZONYL 8300 | ZONYL 8300 | ZONYL 8300 | ZONYL 8412 | ZONYL 8412 | ZONYL 8412 |
| | \multicolumn{8}{c}{Ratio of Extender of Ex. 1/ Fluorochemical} |
| | 1/1 | 2/1 | 0.6/1 | 1/1 | 2/1 | 0.6/1 | 1/1 | 2/1 |
| Spray Repellency | | | | | | | | |
| initial | 100 | 100 | 100 | 100 | 90 | 100 | 100 | 100 |
| 10HW-iron | 90 | 100 | 80 | 80 | 90 | 80 | 90 | 90 |
| 20HW-iron | 60 | 70 | 50 | 70 | 70 | 50 | 60 | 70 |

The data in Table 6 demonstrated that the combination of the extender of Example 1 and different ZONYL products at different ratios achieved effective performance on nylon.

Examples 8-13

The extender compositions were prepared following the procedure of Example 1 except for using different surfactants and solvents as listed in Table 7. The resulting extenders were separately blended with commercially available fluoropolymers, ZONYL 8300, ZONYL 8412, and ZONYL 8932 from E. I. du Pont de Nemours and Company, Wilmington, Del. for performance tests. The ratio of extender to ZONYL was 1:1.

The blends with each ZONYL fluoropolymers were applied to 100% nylon fabric using Test Method 1 described above. The bath contained 20-50 g/L of the blended product. A wetting agent ALKANOL 6112 (available from E. I. du Pont de Nemours and Company, Wilmington, Del.) was also included in the bath at 2 g/L. After application, the fabrics were cured at about 160° C. for about 2 minutes. The fabric was allowed to "rest" after treatment and cure. The treated nylon was tested for oil repellency, water repellency and spray repellency using Test Methods 2, 3, 4 and 5 described above. Results are listed in Tables 8A, 8B, and 8C.

TABLE 7

| Ex. # | Surfactant | Brand name (availability) | Solvent | % Solids in Latex |
|---|---|---|---|---|
| 8 | Octadecylmethyl(polyoxyethylene (15) ammonium chloride, Secondary alcohol ethoxylate | ETHOQUAD 18/25 (available from Akzo Nobel, Chicago, IL), TERGITOL 15-S-20 (available from Union Carbide, Danbury, Conn.) | Dipropylene glycol methyl ether acetate | 28% |
| 9 | Polyethylene Glycol Ester | MAZAR MEPEG 600MS (available from Mazar Chemical Inc., Gurnee, IL) | Hexylene glycol | 32.55% |
| 10 | Polyethylene Glycol Ester/AVITEX R | MAZAR MEPEG 600MS (available from Mazar Chemical Inc., Gurnee, IL)/ AVITEX R (available from Clariant, Mt. Holly, NC) | Hexylene glycol | 31.74% |
| 11 | Alcohol ethoxylate/ Octadecylmethyl(polyoxyethylene (15) ammonium chloride,/ AVITEX R | ETHOX TDA-5 (available from Ethox Chemicals, Greenville, SC)/ ETHOQUAD 18/25 (available from Akzo Nobel, Chicago, IL)/ AVITEX R (available from Clariant, Mt. Holly, NC) | Dipropylene glycol | 28.08% |
| 12 | Polyethylene Glycol Ester/Alkylolamine Hydrochloride mixture | MAZAR MEPEG 600MS (available from Mazar Chemical Inc., Gurnee, IL)/ AVITEX 2153 (available from DuPont, Wilmington, DE) | Hexylene glycol | 32.79% |
| 13 | Polyethylene Glycol Ester/ Di(hydrogenated tallow) dimethyl ammonium chloride | MAZAR MEPEG 600MS (available from Mazar Chemical Inc., Gurnee, IL)/ ARQUAD 2HT 75 (available from Akzo Nobel, Chicago, IL) | Hexylene glycol | 32.73% |

TABLE 8A

ZONYL 8412 + Example Extender

| | none | 1 | 8 | 9 | 10 | 11 | 12 | 13 |
|---|---|---|---|---|---|---|---|---|
| Oil Repellency | | | | | | | | |
| initial | 6 | 6.5 | 6.5 | 6 | 7 | 6.5 | 4.5 | 5 |
| 20HW-iron | 3 | 5 | 4 | 5 | 4.5 | 5.5 | 1 | 2 |
| Water Repellency | | | | | | | | |
| initial | 12 | 12 | 12 | 11 | 12 | 12 | 8.5 | 8.5 |
| 20HW-iron | 8.5 | 7.5 | 7 | 7 | 8 | 8 | 5 | 6 |
| Spray Repellency | | | | | | | | |
| initial | 100 | 90 | 80 | 90 | 100 | 90 | 70 | 90 |
| 20HW-iron | 70 | 70 | 70 | 70 | 75 | 75 | 70 | 80 |

TABLE 8B

ZONYL 8932 + Example Extender

| | none | 1 | 8 | 9 | 10 | 11 | 12 | 13 |
|---|---|---|---|---|---|---|---|---|
| Oil Repellency | | | | | | | | |
| initial | 6.5 | 8 | 6.5 | 6.5 | 7 | 7 | 6.5 | 7.5 |
| 20HW-iron | 4 | 6.5 | 5 | 5.5 | 4 | 4.5 | 6 | 5 |
| Water Repellency | | | | | | | | |
| initial | 12 | 12 | 12 | 12 | 12 | 12 | 12 | 12 |
| 20HW-iron | 8 | 10.5 | 8.5 | 9 | 9 | 10.5 | 9 | 9 |
| Spray Repellency | | | | | | | | |
| initial | 100 | 100 | 100 | 100 | 100 | 100 | 100 | 100 |
| 20HW-iron | 80 | 80 | 80 | 70 | 70 | 70 | 80 | 70 |

TABLE 8C

ZONYL 8300 + Example Extender

| | none | 1 | 8 | 9 | 10 | 11 | 12 | 13 |
|---|---|---|---|---|---|---|---|---|
| Oil Repellency | | | | | | | | |
| initial | 7 | 7 | 6 | 5.5 | 6.5 | 6 | 3.5 | 4 |
| 20HW-iron | 4 | 4.5 | 2 | 3.5 | 4 | 4 | 0.5 | 2 |
| Water Repellency | | | | | | | | |
| initial | 11.5 | 12 | 10 | 10 | 11 | 10.5 | 6.5 | 8.5 |
| 20HW-iron | 8.5 | 9 | 6 | 7 | 8 | 7.5 | 5 | 6 |
| Spray Repellency | | | | | | | | |
| initial | 100 | 100 | 90 | 100 | 90 | 100 | 80 | 90 |
| 20HW-iron | 70 | 70 | 70 | 70 | 70 | 70 | 70 | 70 |

The data in Tables 8A, 8B and 8C demonstrated that the extender compositions of Examples 1 and 8-13 were effective to provide durable repellency using half the fluorine level when prepared using a variety of surfactants and solvents. The fluorine level of the compositions having extenders present was 50% of those having no extender present.

Example 14

A water emulsion was prepared by mixing the following: 80 g of hot deionized $H_2O$ (50-60° C.), 1.6 g of ARMEEN DM18D (available from Akzo Nobel, Chicago, Ill.), 60 g of ethylhexyl methacrylate, 10 g of poly(oxyethylene)7 methacrylate, 2 g of N-methylolacrylamide, 0.3 g of dodecyl mercaptan, 1 g of acetic acid, 0.3 g of 2% sodium chloride solution and 20 g of hexylene glycol, and then charged to a 500 ml of four-necked flask equipped with mechanic stir, thermocouple thermometer and chiller condenser (−5 to −10° C.). The charge was rinsed into the flask with 80 g of hot deionized water and purged with nitrogen for 30 minutes or until the temperature is below 30° C. 10 g of vinylidene chloride was then charged to the reaction flask and mixed for 5 minutes. Then, 0.4 g of "VAZO" 56 WSP (E. I. du Pont de Nemours and Company, Wilmington, Del.) dissolved in 10 g deionized water was added to initiate polymerization. The mixture was heated to 50° C. within half of an hour and maintained for 8 hours. The resulting polymer extender latex (dispersion in water) weighed 250 g with solids content of 28.87%. It was then blended with commercially available fluorinated polymers, ZONYL 8300 and ZONYL 8932 from E. I. du Pont de Nemours and Company, Wilmington, Del. at a ratio of 2:1 of extender to fluorinated polymer for ZONYL 8932 and at a ratio of 1:1 extender to fluorinated polymer for ZONYL 8300. The blends were applied to nylon fabric using Test Method 1 described above. The bath contained 0.133%-0.15% of fluorine. The nylon was tested for repellency using Test Methods 2, 3, 4 and 5 described above. Results are listed in Tables 10A and 10B.

Example 15-17

Comparative Example C

Latex extenders were synthesized by following the same procedure as Example 14 except for using the amount of monomers listed in Table 9.

TABLE 9

| | Example | | | Comparative Ex. C |
|---|---|---|---|---|
| | 15 | 16 | 17 | |
| Monomer, g | | | | |
| Poly(oxyethylene)7 methacrylate | 5 | 10 | 3 | 10 |
| Ethylhexyl methacrylate | 70 | 65 | 50 | 70 |
| Vinylidene chloride | 5 | 5 | 27 | 0 |
| % Solid in Latex | 28.42% | 29.04% | 27.76% | 28.87% |

The extenders and Comparative Example C were blended with ZONYL 8932 and ZONYL 8300 fluorinated polymers in a ratio of 2:1 of extender to fluorinated polymer.

The blends were applied to 100% nylon fabric using Test Method 1 described above. The bath contained 20-50 g/L of the blended product. A wetting agent ALKANOL 6112 (available from E. I. du Pont de Nemours and Company, Wilmington, Del.) was also included in the bath at 2 g/L. After application, the fabrics were cured at about 160° C. for about 2 minutes. The fabric was allowed to "rest" after treatment and cure. The nylon was tested for oil repellency, water repellency and spray repellency and wash durability using Test Methods 4, 2, 3 and 5 described above.

Results are listed in Table 10A for ZONYL 8932/extender blends and in Table 10B for ZONYL 8300/extender blends.

TABLE 10A

|  | Example Extender | | | | |
| --- | --- | --- | --- | --- | --- |
|  | Comparative Ex. C | 14 | 15 | 16 | 17 |
| Oil Repellency | | | | | |
| initial | 6 | 6 | 5.5 | 6 | 5.5 |
| 2HW-iron | 3.5 | 5.5 | 4.5 | 4.5 | 4.5 |
| Water Repellency | | | | | |
| Initial | 10.5 | 10.5 | 10 | 11 | 10 |
| 20HW-iron | 7 | 7.5 | 8.5 | 8.5 | 8.5 |
| Spray Repellency | | | | | |
| initial | 100 | 100 | 100 | 100 | 100 |
| 20HW-iron | 60 | 75 | 70 | 70 | 80 |

TABLE 10B

|  | Example Extender | | | | |
| --- | --- | --- | --- | --- | --- |
|  | Comparative Ex. C | 14 | 15 | 16 | 17 |
| Oil Repellency | | | | | |
| initial | 5.5 | 6 | 6 | 6 | 5 |
| 20HW-iron | 0 | 4 | 4 | 0 | 0.5 |
| Water Repellency | | | | | |
| initial | 10.5 | 7.5 | 9.5 | 6 | 5.5 |
| 20HW-iron | 5 | 4 | 6 | 4 | 5 |
| Spray Repellency | | | | | |
| initial | 80 | 85 | 100 | 90 | 80 |
| 20HW-iron | 70 | 70 | 70 | 60 | 75 |

The data in Table 10A showed that the presence of vinylidene chloride in the extender copolymer of Examples 14-17 blended with ZONYL 8932 improved the performance compared to Comparative Example C that did not contain vinylidene chloride. The data in Table 10B showed that the presence of vinylidene chloride in the extender copolymer of Examples 14-17 blended with ZONYL 8300 improved the oil repellency and spray repellency compared to Comparative Example C that did not contain vinylidene chloride.

Example 18-21

To begin, (a) 70 g of 2-ethylhexylmethacrylate; (b) 10 g of poly(oxyethylene)7 methacrylate; (c) 2 g of aqueous 48% N-methylolacrylamide; 0.3 g of dodecyl mercaptan, 20 g hexylene glycol, 1.6 g of ARMEEN DM 18D, 1.0 g acetic acid, 3 g of aqueous 2% salt (NaCl) solution, and 80 g of hot (50-60° C.) deionized water were emulsified and then charged to a four-necked flask fitted with a stirrer, thermocouple thermometer, and water condenser. The charge was rinsed into the flask with 75 g of hot deionized water and purged with nitrogen at 65° C. for 30 minutes. Then, 0.08 g of "VAZO" 56 WSP (E. I. du Pont de Nemours and Company, Wilmington, Del.) dissolved in 2 g deionized water was added to initiate polymerization. The temperature of the mix rose spontaneously to 79° C. over about 12 minutes, and then began to decline. The temperature controller was reset to 70° C., and the charge was stirred for 4 hours under nitrogen. The resulting polymer extender latex (dispersion in water) weighed 251 g with solids content of 31.7%. This extender was mixed separately with the extenders of Examples 1, 9, 10 and 11 in a ratio of 1:1 to produce a mixture of extenders designated herein as Examples 18, 19, 20 and 21.

This extender mixture was then blended with ZONYL 8932 fluorochemical in a ratio of 2:1 of extender to fluorinated polymer. The blend was applied to 100% cotton twill fabric using Test Method 1 described above. The treating bath contained 45 g/L of the blend, 1 g/L of blocked isocyanate HYDROPHOBOL XAN from Ciba Specialty Chemicals, High Point, N.C., and 70 g/L anti-wrinkle resin, PERMA-FRESH EFC from Omnova Solutions, Chester, S.C. After application, the fabric was cured at 330° C. for 3 minutes. The fabric was allowed to "rest" after treatment and cure. The treated cotton was tested for oil repellency, water repellency and spray repellency and wash durability using Test Methods 4, 2, 3 and 5 described above. For comparison when no extender was present, the bath contained either 15 g/L or 30 g/L of ZONYL 8932 combined with the same bath components. Results are listed in Table 11.

TABLE 11

|  | ZONYL 8932 + Example extender | | | | 15 g/L ZONYL 8932, no extender | 30 g/L ZONYL 8932 no extender |
| --- | --- | --- | --- | --- | --- | --- |
|  | 18 | 19 | 20 | 21 | | |
| Oil Repellency | | | | | | |
| initial | 7 | 7 | 7 | 7 | 5 | 6 |
| 20HW LTD | 6 | 6 | 6 | 6 | 2 | 4 |
| Water Repellency | | | | | | |
| initial | 12 | 12 | 12 | 12 | 7 | 10 |
| 20HW LTD | 10 | 10 | 9 | 11 | 5 | 7.5 |
| Spray Repellency | | | | | | |
| initial | 100 | 100 | 100 | 100 | 100 | 100 |
| 20HW LTD | 80 | 85 | 80 | 85 | 75 | 80 |

The results in Table 11 showed that fluorine efficiency was achieved by using a mixture of extender compositions with the fluorinated polymer. Superior performance was obtained compared to the fluorinated polymer having no extender composition present which had a fluorine level about three times higher than the blends having the extender present.

Example 22

A water emulsion was prepared by mixing the following: 96 g of hot deionized water (50-60° C.), 3.2 g of ETHO-QUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of stearyl methacrylate, 15 g of methyl methacrylate, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol. It was then charged to a 500 ml four-necked flask equipped with mechanical stirrer, thermocouple thermometer and chiller condenser (−5 to −10° C.). The charge was rinsed into the flask with 10 g of hot deionized water and purged with nitrogen for 30 minutes or until the temperature was below 30° C. 15 g of vinylidene chloride was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. within a half hour and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 202.65 g with solids content of 28.74%.

Example 23

A water emulsion was prepared by mixing the following: 96 g of hot deionized water (50-60° C.), 3.2 g of ETHOQUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of stearyl methacrylate, 15 g of vinyl acetate, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol. It was then charged to a 500 ml four-necked flask equipped with mechanical stirrer, thermocouple thermometer and chiller condenser (−5 to −10° C.). The charge was rinsed into the flask with 10 g of hot deionized water and purged with nitrogen for 30 minutes or until the temperature was below 30° C. 15 g of vinylidene chloride was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. within a half hour and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 196.4 g with solids content of 25.91%.

Example 24

A water emulsion was prepared by mixing the following: 96 g of hot deionized water (50-60° C.), 3.2 g of ETHOQUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of stearyl methacrylate, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol. It was then charged to a 500 ml four-necked flask equipped with mechanical stirrer, thermocouple thermometer and chiller condenser (−5 to −10° C.). The charge was rinsed into the flask with 10 g of hot deionized water and purged with nitrogen for 30 minutes or until the temperature was below 30° C. 30 g of vinyl acetate was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. within half of an hour and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 201.56 g with solids content of 28.47%.

Example 25

A water emulsion was prepared by mixing the following: 96 g of hot deionized water (50-60° C.), 3.2 g of ETHOQUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of stearyl methacrylate, 15 g of vinylbenzyl chloride methyl, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol. It was then charged to a 500 ml four-necked flask equipped with mechanical stirrer, thermocouple thermometer and chiller condenser (−5 to −10° C.). The charge was rinsed into the flask with 10 g of hot deionized water and purged with nitrogen for 30 minutes or until the temperature was below 30° C. 15 g of vinylidene chloride was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. within a half hour and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 202.33 g with solids content of 27.13%.

Example 26

A water emulsion was prepared by mixing the following: 96 g of hot deionized water (50-60° C.), 3.2 g of ETHOQUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of stearyl methacrylate, 15 g of styrene, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol. It was then charged to a 500 ml four-necked flask equipped with mechanical stirrer, thermocouple thermometer and chiller condenser (−5 to −10° C.). The charge was rinsed into the flask with 10 g of hot deionized water and purged with nitrogen for 30 minutes or until the temperature was below 30° C. 15 g of vinylidene chloride was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. within a half hour and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 206 g with solids content of 26.39%.

Example 27

A mixture of 96 g of hot deionized water (50-60° C.), 3.2 g of ETHOQUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of butyl methacrylate, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol was charged to a 500 ml four-necked flask equipped with mechanical stirrer, thermocouple thermometer and chiller condenser (−5 to −10° C.). The charge was rinsed into the flask with 10 g of hot deionized water and purged with nitrogen for 30 minutes or until the temperature was below 30° C. 30 g of vinylidene chloride was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. within a half hour and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 205.15 g with solids content of 28.04%.

Example 28

A mixture of 96 g of hot deionized water (50-60° C.), 3.2 g of ETHOQUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of ethylhexyl methacrylate, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol was charged to a 500 ml four-necked flask equipped with mechanical stirrer, thermocouple thermometer and chiller condenser (−5 to −10° C.). The charge was rinsed into the flask with 10 g of hot deionized water and purged with nitrogen for 30 minutes or until the temperature was below 30° C. 30 g of vinylidene chloride was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. within a half hour and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 185.43 g with solids content of 29.26%.

Example 29

A mixture of 96 g of hot deionized water (50-60° C.), 3.2 g of ETHOQUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of lauryl methacrylate, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol was charged to a 500 ml four-necked flask equipped with mechanical stirrer, thermocouple thermometer and chiller condenser (−5 to −10° C.). The charge was rinsed into the flask with 10 g of hot deionized water and purged with nitrogen for 30 minutes or until the temperature was below 30° C. 30 g of vinylidene chloride was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. within a half hour and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 185.14 g with solids content of 27.92%.

Example 30

A mixture of 96 g of hot deionized water (50-60° C.), 3.2 g of ETHOQUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of tridecyl methacrylate, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol was charged to a 500 ml four-necked flask equipped with mechanical stirrer, thermocouple thermometer and chiller condenser (−5 to −10° C.). The charge was rinsed into the flask with 10 g of hot deionized water and purged with nitrogen for 30 minutes or until the temperature was below 30° C. 30 g of vinylidene chloride was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. within a half hour and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 187.53 g with solids content of 27.2%.

Example 31

A mixture of 96 g of hot deionized water (50-60° C.), 3.2 g of ETHOQUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of hexyl methacrylate, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol was charged to a 500 ml four-necked flask equipped with mechanical stirrer, thermocouple thermometer and chiller condenser (−5 to −10° C.). The charge was rinsed into the flask with 10 g of hot deionized water and purged with nitrogen for 30 minutes or until the temperature was below 30° C. 30 g of vinylidene chloride was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. within a half hour and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 201.34 g with solids content of 29.5%.

Example 32

A water emulsion was prepared by mixing the following: 96 g of hot deionized water (50-60° C.), 3.2 g of ETHOQUAD 18/25 (available from Akzo Nobel, Chicago, Ill.), 4.6 g of tridecyl alcohol 5-ethylene oxide adduct (ETHOX TDA-5, available from Ethox Chemicals, Greenville, S.C.), 30 g of cyclohexyl methacrylate, 1.25 g of N-methylolacrylamide, 0.68 g of 2-hydroxyethyl methacrylate, 1.25 g of poly(oxyethylene)7 methacrylate, 0.34 g of dodecyl mercaptan and 19.36 g of dipropylene glycol. It was then charged to a 500 ml four-necked flask equipped with mechanic stir, thermocouple thermometer and chiller condenser (−5 to −10° C.). The charge was rinsed into the flask with 10 g of hot deionized water and purged with nitrogen for 30 minutes or until the temperature was below 30° C. 30 g of vinylidene chloride was then charged to the reaction flask and mixed for 5 minutes. Then, 0.34 g of "VAZO" 56 WSP (E. I. du Pont de Nemours and Company, Wilmington, Del.) dissolved in 10 g deionized water was added to initiate polymerization. The mixture was heated to 50° C. within a half hour and maintained for 8 hours. Following the polymerization a water solution of 0.46 g of DUPONOL WAQE (available from Witco Corporation, Greenwich, Conn.) was mixed with the product at room temperature. The resulting polymer extender latex (dispersion in water) weighed 203.37 g with solids content of 28%.

The above-resulting latexes of Examples 22 to 32 were separately blended with commercially available fluoropolymer ZONYL 8932 from E. I. du Pont de Nemours and Company, Wilmington, Del. for performance tests. The blends contained a ratio of extender to fluoropolymer of 1:1. The blends with ZONYL fluoropolymer were applied to 100% nylon fabric using Test Method 1 described above. The bath contained 20-50 g/L of the blended product for the data in Table 13 and the bath contained 10-15 g/L of the fluorinated polymer. A wetting agent ALKANOL 6112 (available from E. I. du Pont de Nemours and Company, Wilmington, Del.) was also included in the bath at 2 g/L. After application, the fabrics were cured at about 160° C. for about 2 minutes. The fabric was allowed to "rest" after treatment and cure. The treated fabric was tested for oil repellency, water repellency and spray repellency using Test Methods 2, 3, 4 and 5 described above. Results are listed in Table 12.

g of "VAZO" 56 WSP (E. I. du Pont de Nemours and Company, Wilmington, Del.) dissolved in 10 g deionized water is added to initiate polymerization. The mixture is heated to 50° C. over a period of 30 minutes and is maintained for 8 hours with agitator at 150 RPM. Following the polymerization a water solution of 0.46 g of DUPONOL WAQE (available from Witco Corporation, Greenwich, Conn.) is mixed with the product at room temperature. The resulting latex extender is filtered through a milk filter. The extender is mixed with ZONYL 8932 at a ratio of extender to fluorinated polymer of 2:1. The blend is applied to 100% cotton fabric and to nylon fabric, tested, laundered, and retested as in Example 11. The test results show durability of performance after washing the fabric.

What is claimed is:

1. A polymer composition consisting essentially of monomers copolymerized in the following percentages by weight:

(a) from about 5% to about 90% of a monomer of the formula I:

$$R_1—OC(O)—C(R)=CH_2 \quad (I)$$

(b) from about 5% to about 85% of vinylidene chloride, vinyl chloride, vinyl acetate, or a mixture thereof, (c) from about 0.5% to about 3% of a monomer of the formula II:

$$HO—CH_2—NH—C(O)—C(R)=CH_2 \quad (II)$$

TABLE 12

| | ZONYL 8932 + Example Extender | | | | | | | | | | | Zonyl 8932 |
| --- | --- | --- | --- | --- | --- | --- | --- | --- | --- | --- | --- | --- |
| | 22 | 23 | 24 | 25 | 26 | 27 | 28 | 29 | 30 | 31 | 32 | no extender |
| Oil Repellency | | | | | | | | | | | | |
| initial | 5.5 | 6 | 6.5 | 6 | 6 | 5.5 | 5.5 | 6 | 5.5 | 6 | 6.5 | 6.5 |
| 20HW-iron | 4.5 | 5 | 4 | 5 | 4 | 5.5 | 5 | 5 | 5.5 | 5.5 | 5 | 4.5 |
| 30HW-iron | 3.5 | 2.5 | 2 | 2.5 | 2.5 | 4 | 4 | 3 | 4 | 4 | 3 | 2.5 |
| Water Repellency | | | | | | | | | | | | |
| initial | 11 | 12 | 11 | 11 | 11.5 | 10.5 | 11 | 11.5 | 11 | 11.5 | 12 | 11.5 |
| 20HW-iron | 8.5 | 6.5 | 6.5 | 8 | 6 | 9 | 7.5 | 10 | 9 | 8 | 8 | 7.5 |
| 30HW-iron | 6 | 6 | 4.5 | 6 | 6 | 7.5 | 7 | 8 | 8 | 7 | 7 | 6 |
| Spray Repellency | | | | | | | | | | | | |
| initial | 100 | 100 | 100 | 100 | 90 | 100 | 100 | 90 | 100 | 100 | 90 | 100 |
| 20HW-iron | 90 | 80 | 70 | 90 | 80 | 90 | 90 | 90 | 90 | 90 | 90 | 90 |
| 30HW-iron | 80 | 50 | 50 | 70 | 70 | 85 | 90 | 85 | 80 | 85 | 85 | 75 |

The results in Table 12 showed that comparing the extender of the present invention combined with fluorinated polymer to the same fluorinated polymer without extender present, better or comparable performance was obtained with use of the extenders with 60% of fluorine present.

Example 33

A water emulsion is prepared by mixing the following: 96 g of hot deionized H$_2$O (50-60° C.), 3.2 g of ETHOQUAD 18/25 (available from Akzo Nobel, Chicago, Ill.), 4.6 g of tridecyl alcohol 5-ethylene oxide adduct (ETHOX TDA 5 from Ethox Chemicals, Greenville, S.C.), 30 g of stearyl methacrylate, 1.25 g of poly(oxyethylene)7 methacrylate, 1.25 g of N-methylolacrylamide, 0.68 g of 2-hydroxyethyl methacrylate, 0.34 g of dodecyl mercaptan and 19.36 g of dipropylene glycol, and then is charged to a 1 L autoclave. The autoclave is sealed and is evacuated/filled with nitrogen three times. 30 g of vinyl chloride is then charged. Then, 0.34

(d) from about 0.5% to about 3% of a monomer of the formula III $$HO—CH_2CH_2—OC(O)—C(R)=CH_2 \quad (III)$$

and (e) from about 1% to about 5% of a monomer of the formula IV:

$$H—(OCH_2CH_2)_m—O—C(O)—C(R)=CH_2 \quad (IV)$$

(f) from 0% to about 25% of methyl methacrylate, vinylbenzyl chloride, styrene or a mixture thereof, wherein each R is independently H or CH$_3$;

R$_1$ is a linear or branched or cyclic alkyl chain having from about 4 to about 18 carbon atoms, and m is 2 to about 10, said composition increasing fluorine efficiency in treatment of a substrate by permitting use of lower levels of fluorinated surface treating agents providing durable oil repellency and water repellency, such that the fluorine content of a blend of said composition with a fluorinated surface treating agent is from about 1.5% to about 6.6% by weight of the blend.

2. The composition of claim 1 wherein monomer (a) is stearyl (meth)acrylate, 2-ethylhexyl(meth)acrylate, butyl (meth)acrylate, hexyl (meth)acrylate, cyclohexyl(meth)acrylate, lauryl(meth)acrylate, tridecyl (meth)acrylate, or a mixture thereof.

3. The composition of claim 1 wherein m is between about 5 and about 10.

4. The composition of claim 1 wherein monomer (c) is N-methylolacrylamide.

5. The composition of claim 1 wherein monomer (d) is hydroxyethyl methacrylate.

6. The composition of claim 1 wherein monomer (e) is an ethoxylated (meth)acrylate wherein the number of ethoxy groups is between about 2 and about 10.

7. The composition of claim 1 as an aqueous dispersion.

8. The composition of claim 1 further comprising a blocked isocyanate.

9. The composition of claim 1 further comprising at least one additional extender composition.

* * * * *

UNITED STATES PATENT AND TRADEMARK OFFICE
CERTIFICATE OF CORRECTION

| | | |
|---|---|---|
| PATENT NO. | : 7,652,112 B2 | Page 1 of 1 |
| APPLICATION NO. | : 11/175680 | |
| DATED | : January 26, 2010 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 624 days.

Signed and Sealed this

Twenty-third Day of November, 2010

David J. Kappos
*Director of the United States Patent and Trademark Office*